US012260792B2

(12) United States Patent
Li et al.

(10) Patent No.: US 12,260,792 B2
(45) Date of Patent: Mar. 25, 2025

(54) DISPLAY PANEL, METHOD FOR DETECTING AND COMPENSATING DISPLAY PANEL, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Wei Li, Beijing (CN); Chienpang Huang, Beijing (CN); Zhangmin Wu, Beijing (CN); Linchang He, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 17 days.

(21) Appl. No.: 18/281,992

(22) PCT Filed: Nov. 19, 2021

(86) PCT No.: PCT/CN2021/131702
§ 371 (c)(1),
(2) Date: Sep. 14, 2023

(87) PCT Pub. No.: WO2022/193708
PCT Pub. Date: Sep. 22, 2022

(65) Prior Publication Data

US 2024/0046829 A1 Feb. 8, 2024

(30) Foreign Application Priority Data

Mar. 15, 2021 (CN) ........................ 202110277532.X

(51) Int. Cl.
*G09G 3/3275* (2016.01)
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01);
(Continued)

(58) Field of Classification Search
None
See application file for complete search history.

(56) References Cited

U.S. PATENT DOCUMENTS

| | | | |
|---|---|---|---|
| 9,672,087 | B2 | 6/2017 | Lee et al. |
| 11,004,375 | B2 | 5/2021 | Xu et al. |

(Continued)

FOREIGN PATENT DOCUMENTS

| | | | |
|---|---|---|---|
| CN | 102411911 | A | 4/2012 |
| CN | 104505045 | A | 4/2015 |

(Continued)

OTHER PUBLICATIONS

International Search Report and Written Opinion mailed on Feb. 17, 2022, in corresponding PCT/CN2021/131702, 6 pages.

(Continued)

*Primary Examiner* — Carl Adams
(74) *Attorney, Agent, or Firm* — XSENSUS LLP

(57) ABSTRACT

A display panel, a method for detecting and compensating the display panel, and a display device are provided. The display panel includes a first voltage terminal, a gate driving circuit, and a detection circuit. The gate driving circuit includes multiple stages of first output terminals; and the detection circuit includes a voltage divider circuit, multiple first switching units, and multiple second switching units. The voltage divider circuit includes multiple stages of
(Continued)

voltage output terminals, and the voltage output terminals and the first output terminals are arranged in one-by-one correspondence; the first switching units and the voltage output terminals are arranged in one-by-one correspondence; the second switching units and the first switching units are arranged in one-by-one correspondence; and the second switching units have second terminals connected to a second output terminal.

18 Claims, 8 Drawing Sheets

(52) U.S. Cl.
CPC ............... *G09G 2300/0842* (2013.01); *G09G 2310/0286* (2013.01); *G09G 2310/08* (2013.01); *G09G 2330/021* (2013.01)

(56) References Cited

U.S. PATENT DOCUMENTS

| | | | | |
|---|---|---|---|---|
| 2008/0218456 | A1* | 9/2008 | Park ...................... | H03M 1/682 345/77 |
| 2013/0069928 | A1 | 3/2013 | Mizusako et al. | |
| 2015/0026506 | A1 | 1/2015 | Lee et al. | |
| 2018/0190171 | A1 | 7/2018 | Tashiro | |
| 2020/0357319 | A1 | 11/2020 | Xu et al. | |

FOREIGN PATENT DOCUMENTS

| | | | |
|---|---|---|---|
| CN | 104992687 | A | 10/2015 |
| CN | 105096789 | A | 11/2015 |
| CN | 106297637 | A | 1/2017 |
| CN | 110192240 | A | 8/2019 |
| CN | 209947397 | U | 1/2020 |
| CN | 113053275 | A | 6/2021 |
| JP | 2000-010523 | A | 1/2000 |
| JP | 2010-107799 | A | 5/2010 |
| TW | 201643855 | A | 12/2016 |
| TW | I579820 | B | 4/2017 |

OTHER PUBLICATIONS

Notice of Allowance issued on Jul. 27, 2022, in corresponding Chinese patent Application No. 202110277532.X, 7 pages.

* cited by examiner

DISPLAY PANEL, METHOD FOR DETECTING AND COMPENSATING DISPLAY PANEL, AND DISPLAY DEVICE

CROSS REFERENCE TO RELATED APPLICATIONS

This application is a U.S. national phase application of International Application No. PCT/CN2021/131702, filed on Nov. 19, 2021, which claims priority to Chinese Patent Application No. 202110277532.X, filed on Mar. 15, 2021 and entitled "DISPLAY PANEL, METHOD FOR DETECTING AND COMPENSATING DISPLAY PANEL, AND DISPLAY DEVICE", the entire contents of each are incorporated herein by reference.

TECHNICAL FIELD

The present disclosure relates to the field of display technology, in particular to a display panel, a method for detecting the display panel, a method for compensating the display panel, and a display device.

BACKGROUND

In the related technology, a light-emitting unit in a display panel usually need to be driven by a low-level terminal and a high-level terminal. The low-level terminal and the high-level terminal are easily affected by various factors and presents abnormal voltage values, which makes the display panel unable to operate properly.

It should be noted that the information disclosed above is used to enhance the understanding of the background of the present disclosure only, and therefore may include information that does not constitute prior art already known to those of ordinary skill in the art.

SUMMARY

According to an aspect of the present disclosure, a display panel is provided, which includes a first voltage terminal; a gate driving circuit, wherein the gate driving circuit includes multiple stages of first output terminals, and the multiple stages of first output terminals sequentially output shift signals at intervals; and a detection circuit, including: a voltage divider circuit connected between the first voltage terminal and a reference voltage terminal, wherein the voltage divider circuit includes multiple stages of voltage output terminals, and the voltage output terminals are arranged in one-by-one correspondence with the first output terminals; multiple first switching units arranged in one-by-one correspondence with the multiple stages of voltage output terminals, wherein control terminals of the first switching units are connected to the voltage output terminals corresponding thereto, and first terminals of the first switching units are connected to a first power supply terminal; and multiple second switching units arranged in one-by-one correspondence with the multiple first switching units, wherein control terminals of the second switching units are connected to the first output terminals corresponding thereto, first terminals of the second switching units are connected to second terminals of the first switching units corresponding thereto, and second terminals of the second switching units are connected to a second output terminal.

In some embodiments of the present disclosure, the display panel further includes a driving chip connected to the first power supply terminal, a second voltage terminal and a starting signal terminal, wherein the driving chip is configured to provide corresponding signals to the first power supply terminal, the second voltage terminal, and the starting signal terminal, respectively, and the gate driving circuit is connected to the starting signal terminal, and wherein in a frame driving cycle, the gate driving circuit is configured to respond to an effective level signal at the starting signal terminal and start outputting the shift signals to the first output terminals, and the effective level signal at the starting signal terminal is earlier in timing than all shift signals; a third switching unit, wherein a control terminal of the third switching unit is connected to a second power supply terminal, and a first terminal of the third switching unit is connected to the first power supply terminal; and a fourth switching unit, wherein a control terminal of the fourth switching unit is connected to the starting signal terminal, a first terminal of the fourth switching unit is connected to a second terminal of the third switching unit, and a second terminal of the fourth switching unit is connected to the second output terminal.

In some embodiments of the present disclosure, the voltage divider circuit includes multiple resistors connected in series between the first voltage terminal and the reference voltage terminal, wherein the voltage output terminals of the voltage divider circuit are connected between adjacent resistors.

In some embodiments of the present disclosure, there is one resistor is connected between adjacent two stages of voltage output terminals, and resistance values of the multiple resistors are the same.

In some embodiments of the present disclosure, the first switching unit includes a first transistor, wherein a gate of the first transistor is connected to a voltage output terminal corresponding thereto, and a first electrode of the first transistor is connected to the first power supply terminal. The second switching unit includes a second transistor, wherein a gate of the second transistor is connected to a first output terminal corresponding thereto, a first electrode of the second transistor is connected to a second electrode of the first transistor corresponding thereto, and a second electrode of the second transistor is connected to the second output terminal.

In some embodiments of the present disclosure, the third switching unit includes a third transistor, wherein a gate of the third transistor is connected to the second power supply terminal, and a first electrode of the third transistor is connected to the first power supply terminal. The fourth switching unit includes a fourth transistor, wherein a gate of the fourth transistor is connected to the starting signal terminal, a first electrode of the fourth transistor is connected to a second electrode of the third transistor, and a second electrode of the fourth transistor is connected to the second output terminal.

In some embodiments of the present disclosure, the first transistor is an N-type transistor or P-type transistor, and the second transistor is an N-type transistor or P-type transistor, the third transistor is an N-type transistor or P-type transistor, and the fourth transistor is an N-type transistor or P-type transistor.

In some embodiments of the present disclosure, the display panel further includes a display screen including multiple light-emitting units, wherein the first voltage terminal is located on the display screen, and is connected to cathodes of the light-emitting units.

In some embodiments of the present disclosure, the display panel further includes a display screen including multiple pixel driving circuits, wherein the pixel driving circuit includes a driving transistor, the first voltage terminal is located on the display screen, and wherein a first electrode of the driving transistor is connected to the first voltage terminal, and the driving transistor is configured to output a driving current at a second electrode based on a gate voltage of the driving transistor.

In some embodiments of the present disclosure, the display panel further includes multiple pixel driving circuits, wherein the gate driving circuits are configured to provide gate driving signals to the pixel driving circuits.

In some embodiments of the present disclosure, the multiple stages of voltage output terminals include n stages of power output terminals, and wherein a voltage of an $m^{th}$ stage of the voltage output terminal is less than a voltage of an $(m+1)^{th}$ stage of the voltage output terminal; and an $m^{th}$ stage of the first output terminal is arranged in correspondence with the $m^{th}$ stage of the voltage output terminal, and wherein the first output terminals sequentially output the shift signals at intervals in the order a number of the stage of the first output terminal increases, or the first output terminals sequentially output the shift signals at intervals in the order the number of the stage of the first output terminal decreases.

In some embodiments of the present disclosure, the gate driving circuit includes multiple cascaded shift register wilts, and output terminals of at least some of the shift register units are configured to form the first output terminals.

In some embodiments of the present disclosure, multiple stages of the shift register units sequentially output the shift signals in the order a number of the stage of the shift register unit increases, and the multiple stages of first output terminals sequentially output the shift signals in the order the number of the stage of the first output terminal increases; and wherein an output terminal of an $(M+(X-1)N)^{th}$ stage of the shift register unit is configured to form an $X^{th}$ stage of the first output terminal, where M, N, and X are positive integers greater than or equal to 1, and N is not equal to M.

In some embodiments of the present disclosure, the display screen includes a non-display area, and the detection circuit is integrated into the non-display area of the display screen.

In some embodiments of the present disclosure, the detection circuit further includes an RC filtering circuit connected to the second output terminal.

According to an aspect of the present disclosure, a method for detecting a display panel is provided, which is configured to detect the display panel described above, including: obtaining a number of pulse signals output by the second output terminal in a frame driving cycle; and determining whether a voltage of the first voltage terminal and the gate driving circuit in the display panel are normal based on the number of the pulse signals output by the second output terminal in the frame driving cycle; wherein when the number of the pulse signals output by the second output terminal in the frame driving cycle is equal to a preset value, the voltage of the first voltage terminal and the gate driving circuit are normal, and when the number of the pulse signals output by the second output terminal in the frame driving cycle is not equal to the preset value, the voltage of the first voltage terminal or the gate driving circuit is abnormal.

According to an aspect of the present disclosure, a method for compensating a display panel is provided, which is configured to compensate the display panel described above, including: obtaining a number of pulse signals output by the second output terminal in a frame driving cycle; and compensating a voltage of the first voltage terminal based on the number of the pulse signals output by the second output terminal in the frame driving cycle.

According to an aspect of the present disclosure, a display device is provided, the display device includes the display panel described above and a processor, wherein the processor is connected to the second output terminal of the display panel, and configured to record a number of pulse signals output by the second output terminal during a frame drive cycle.

It should be understood that the general description above and the detailed description in the following are only illustrative and explanatory, and do not limit the present disclosure.

BRIEF DESCRIPTION OF THE DRAWINGS

The drawings herein, which are incorporated in and constitute a portion of this specification, illustrate embodiments consistent with the present disclosure and serve together with the specification to explain principles of the present disclosure. It is apparent that the drawings in the following description are only some embodiments of the present disclosure, and other drawings can be obtained based on the drawings by those of ordinary skill in the art without creative effort.

DETAILED DESCRIPTION

Figure 1:
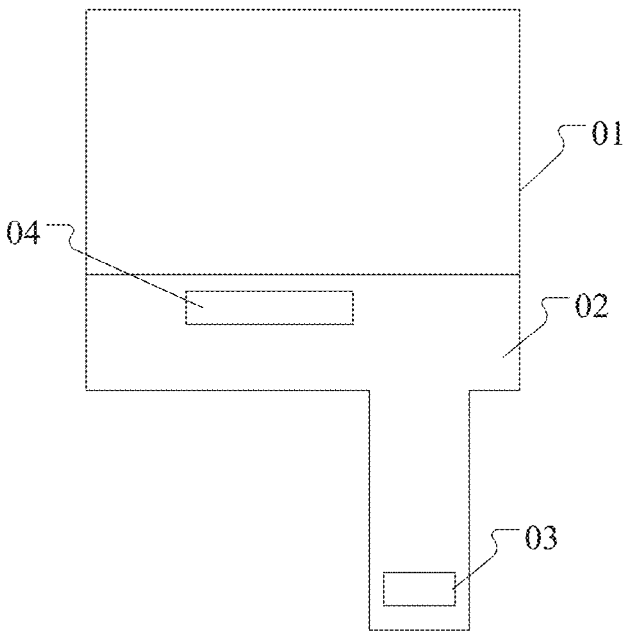
FIG. 1 is a schematic structural diagram of a display panel in the related technology.

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the figures denote the same or similar parts, and thus their detailed description will be omitted.

Although relative terms such as "up" and "down" are used in this specification for describing a relative relationship between one component and another component illustrated, these terms are only used for convenience in this specification, such as according to a direction of an example shown in the drawings. It can be understood that if the illustrated device is flipped so that it is upside down, the component described as "up" will become the component described as "down". Other relative terms, such as "high", "low", "top", "bottom", "left", "right", etc., also have similar meanings. When a certain structure is "on" another structure, it may mean that the structure is formed integrally on the other structure, or the structure is arranged "directly" on the other structure, or the structure is arranged "indirectly" on the other structure through a third structure.

Terms "a", "an", and "the" are used to indicate presence of one or more elements/constituent parts/etc. Terms "include" and "have" are used to indicate open inclusion and mean that there may be other elements/constituent parts/etc., in addition to the listed elements/constituent parts/etc.

Figure 2:
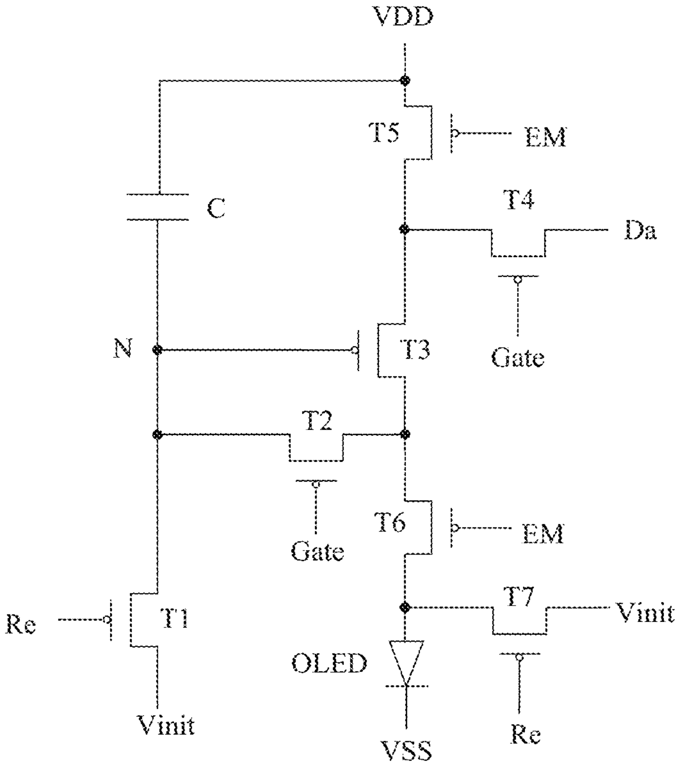
FIG. 2 is a structural diagram of a pixel driving circuit in the related technology.

As shown in FIG. 1, a schematic structural diagram of a display panel in the related technology is provided. The display panel can include a display screen 01, a flexible circuit board 02, a driving chip 04 (driver IC), and a power management chip 03 (power IC). The flexible circuit board 02 can be connected to the display screen 01 by binding a PIN corner, and connected to the power management chip 03 through a connector. As shown in FIG. 2, a structural diagram of a pixel driving circuit in the related technology is provided. In the related technology, the pixel driving circuit can include a first transistor T1, a second transistor T2, a driving transistor T3, a fourth transistor T4, a fifth transistor T5, a sixth transistor T6, a seventh transistor 17, and a capacitor C. A first electrode of the first transistor T1 is connected to a node N, a second electrode of the first transistor T1 is connected to an initial signal terminal Vinit, and a gate of the first transistor 11 is connected to a reset signal terminal Re. A first electrode of the second transistor T2 is connected to a second electrode of the driving transistor T3, a second electrode of the second transistor T2 is connected to the node N, and a gate of the second transistor T2 is connected to a gate driving signal terminal Gate. A gate of the driving transistor T3 is connected to the node N, and a first electrode of the driving transistor T3 is connected to a first power signal terminal VDD. A first electrode of the fourth transistor T4 is connected to a data signal terminal Da, a second electrode of the fourth transistor 14 is connected to the first electrode of the driving transistor T3, and a gate of the fourth transistor T4 is connected to the gate driving signal terminal Gate. A first electrode of the fifth transistor T5 is connected to the first power signal terminal VDD, a second electrode of the fifth transistor T5 is connected to the first electrode of the driving transistor T3, and a gate of the fifth transistor T5 is connected to an enable signal terminal EM. A first electrode of the sixth transistor T6 is connected to the first electrode of the driving transistor T3, and a gate of the sixth transistor T6 is connected to enable signal terminal EM. A first electrode of the seventh transistor T7 is connected to the initial signal terminal Vinit, and a second electrode of the seventh transistor T7 is connected to a second electrode of the sixth transistor T6. The capacitor C is connected between the gate of the driving transistor T3 and the first power signal terminal VDD. The pixel driving circuit can be connected to a light-emitting unit OLED, for driving the light-emitting unit OLED to emit light. An anode of the light-emitting unit OLED can be connected to the second electrode of the sixth transistor T6, and a cathode of the light-emitting unit can be connected to a second power signal terminal VSS. All transistors T1-T7 can be P-type transistors. The power management chip 03 can provide a high-level signal to the first power signal terminal VDD in the pixel driving circuit and a low-level signal to the second power signal terminal VSS. A voltage of the high-level signal can usually be +4.6V, and a voltage of the low-level signal usually can be −2.4V. The high-level signal and the low-level signal output by the power management chip 03 usually need to be transmitted through the connector, the flexible circuit board 02, the binding PIN corner, and other connecting components to the pixel driving circuit and the light-emitting unit located in the display screen 01. If any of above connecting components are faulty, the voltage abnormality in the high-level signal and the low-level signal transmitted to the display screen would occur, resulting that the display panel cannot operate properly.

Figure 3:
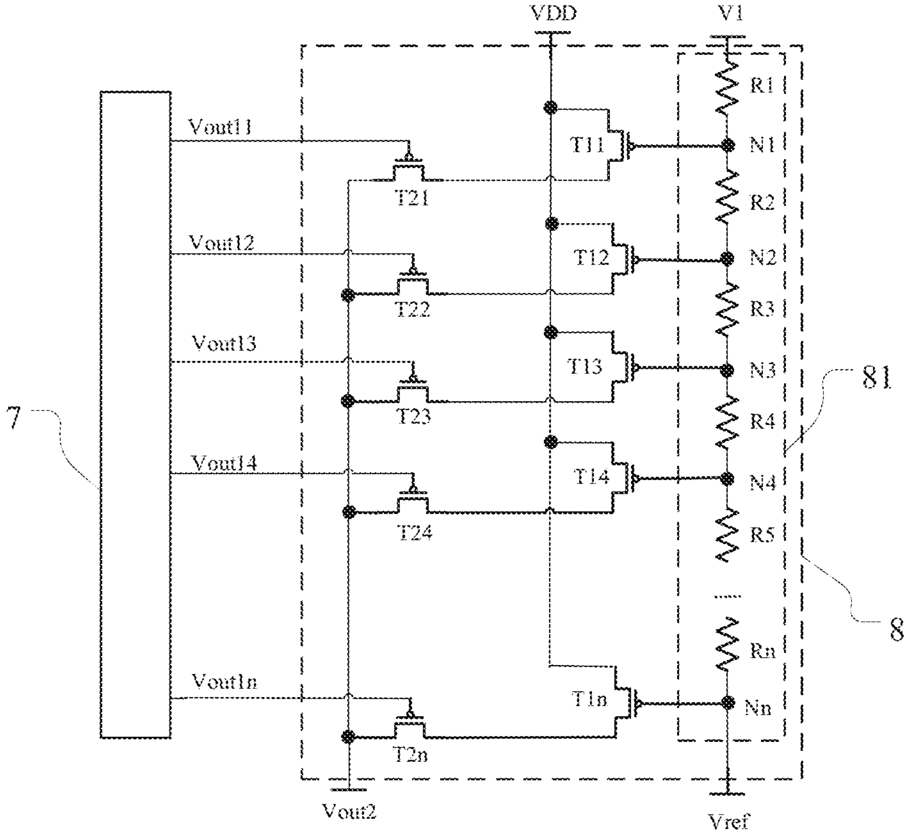
FIG. 3 is a schematic structural diagram of a display panel according to embodiments of the present disclosure.
Figure 4:
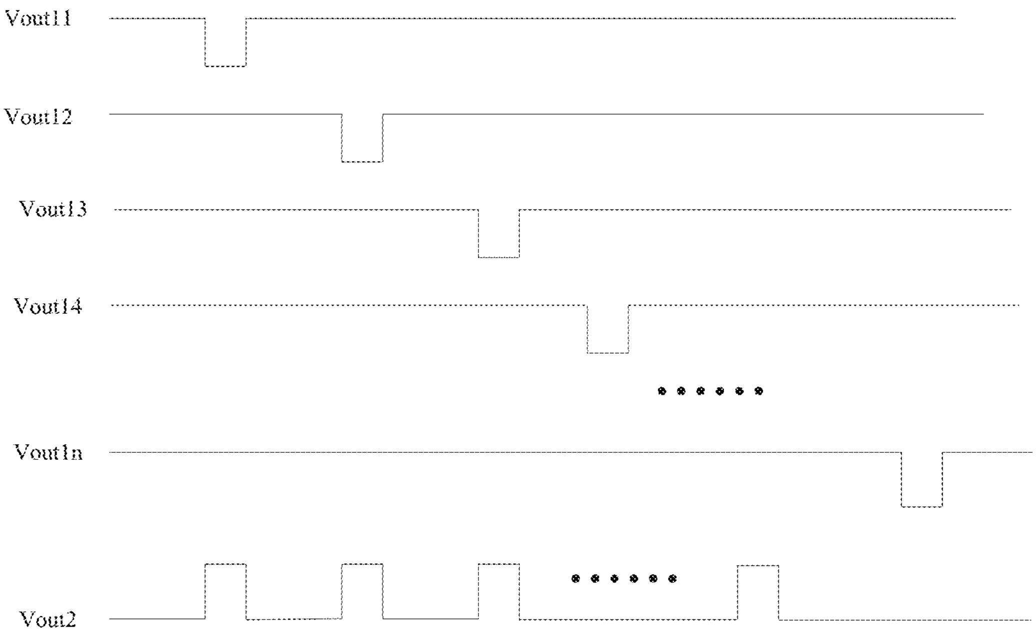
FIG. 4 shows a timing diagram of each node in FIG. 3.

Embodiments of the present disclosure provide a display panel, as shown in FIGS. 3 and 4, FIG. 3 is a schematic structural diagram of a display panel according to embodiments of the present disclosure, and FIG. 4 is a timing diagram of each node in FIG. 3. Vout11 is the timing diagram of a first output terminal Vout11 in FIG. 3, Vout12 is the timing diagram of a first output terminal Vout12 in FIG. 3, Vout13 is the timing diagram of a first output terminal Vout13 in FIG. 3, Vout14 is the timing diagram of a first output terminal Vout14 in FIG. 3, Vout1*n* is the timing diagram of a first output terminal Vout1*n* in FIG. 3, and Vout2 is the timing diagram of a second output terminal Vout2. The display panel can include a first voltage terminal V1, a gate driving circuit 7, and a detection circuit 8. The gate driving circuit 7 can include n stages of first output terminals Vout11, Vout12, Vout13, Vout14, . . . , Vout1*n*. As shown in FIG. 4, the n stages of first output terminals Vout11, Vout12, Vout13, Vout14, . . . , Vout in can sequentially output shift signals at intervals. The detection circuit 8 can include a voltage divider circuit 81, n first transistors T11, T12, T13, T14, . . . , and n second transistors T21, T22, T23, T24, . . . , T2*n*. The voltage divider circuit 81 can be connected between a first voltage terminal V1 and a reference voltage terminal Vref. The voltage divider circuit 81 can include n stages of voltage output terminals N1, N2, N3, N4, . . . , Nn, and the voltage output terminals N1, N2, N3 N4, . . . , Nn and the first output terminals Vout11, Vout12, Vout13, Vout14, . . . , Vout1*n* can be arranged in one-by-one correspondence. For example, the voltage output terminal N1 can be arranged in correspondence with the first output terminal Vout11, the voltage output terminal N2 can be arranged in correspondence with the first output terminal Vout12, and the voltage output terminal Nn can be arranged in correspondence with the first output terminal Vout1*n*. Multiple first transistors T11, T12, T13, T14, . . . , T1*n* and multiple stages of voltage output terminals N1, N2, N3, N4, . . . , Nn can be arranged in one-by-one correspondence. For example, the first transistor T11 can be arranged in correspondence with the voltage output terminal N1, the first transistor T12 can be arranged in correspondence with the voltage output terminal N2, and the first transistor T1*n* can be arranged in correspondence with the voltage output terminal Nn. A gate of the first transistor can be connected to the voltage output terminal corresponding thereto, and a first electrode of each first transistor is connected to the first power supply terminal VDD. Multiple second transistors are arranged in one-by-one correspondence with the multiple first transistors. For example, the second transistor T21 is arranged in correspondence with the first transistor T11, the second transistor T22 is arranged in correspondence with the first transistor T12, and the second transistor T2*n* is arranged in correspondence with the first transistor Tin. The first transistor and the first output terminal corresponding to the same voltage output terminal are arranged in correspondence, and the second transistor that is arranged in correspondence with the same first transistor is arranged in correspondence with the first output terminal. For example, the second transistor T21 is arranged in correspondence with the first output terminal Vout11, the second transistor T22 is arranged in correspondence with the first output terminal Vout12, and the second transistor T2*n* is arranged in correspondence with the first output terminal Vout1*n*. A gate of the second transistor can be connected to first output terminal corresponding thereto, a first electrode of the second transistor is connected to a second electrode of the first transistor corresponding thereto, and a second electrode of the second transistor is connected to a second output terminal Vout2. In some embodiments, n can be a positive integer greater than 1.

In some embodiments, as shown in FIG. 3, the first transistor and the second transistor can be P-type transistors. The first power supply VDD can provide high level, and a voltage of the first power supply VDD can usually be 1.8V or 3.3V. A voltage of the first voltage terminal V1 can be a low-level voltage. A voltage of the reference voltage terminal Vref can be greater than the voltage of the first voltage terminal V1, and voltage difference between the reference voltage terminal Vref and the first power supply terminal VDD is greater than a threshold voltage of the first transistor. Under the action of the voltage divider circuit 81, voltages of multiple stages of voltage output terminals N1, N2, N3, N4, . . . , Nn increase as their number of stages increases. For example, the voltage of the voltage output terminal N2 is greater than that of the voltage output terminal N1. When the voltage difference between the voltage output terminal and the first power supply terminal VDD is less than the threshold voltage of the first transistor, the first transistor is turned on. For example, when the voltage difference between the voltage output terminal N1 and the first power supply terminal VDD is less than the threshold voltage of the first transistor T11, the first transistor T11 is turned on, the first power supply terminal VDD charges the first electrode of the second transistor T21, and the second transistor T21 can be turned on under the action of a shift signal of the first output terminal Vout11. An effective low level of the shift signal can be −7V, and an ineffective level of the first output terminal can be +7V The second transistor can be turned on only under the effective low level of the shift signal and turned off under the ineffective level of the first output terminal. As a result, a high-level pulse signal is formed at the second output terminal Vout2. When the voltage at the voltage output terminal increases to a certain value, the voltage difference between the voltage output terminal and the first power supply terminal VDD is greater than the threshold voltage of the first transistor, for example, when the voltage difference between the $(m-1)^{th}$ stage of the voltage output terminal Nm−1 and the first power supply terminal VDD is less than the threshold voltage of the first transistor T1(M−1), and the voltage difference between the $m^{th}$ stage of the voltage output terminal Nm and the first power supply terminal VDD is greater than the threshold voltage of the first transistor T1*m* the first transistor Tm corresponding to the m stage of the voltage output terminal Nm will be unable to be turned on, and thus in one driving cycle of the gate driving circuit (i.e., a time period during which each first output terminal in the gate driving circuit sequentially outputs one effective level at intervals), the second output terminal can output (m−1) high-level pulses. The display panel can determine whether the voltage of the first voltage terminal V1 is abnormal based on the number of high-level pulses at the second output terminal Vout2 in one driving cycle of the gate driving circuit. For example, the display panel can set the number of high-level pulses output by the second output terminal Vout2 to 8 when the first voltage terminal V1 is in a normal value range. When the number of high-level pulses output by the second output terminal Vout2 is greater than 8, it indicates that the voltage of the first voltage terminal V1 is too small. When the number of high-level pulses output by the second output terminal Vout2 is less than 8, it indicates that the voltage of the first voltage terminal V1 is too large.

It should be noted that the threshold voltage and resistance values of the first transistor in different display panels cannot be completely consistent due to process errors. Therefore, when the display panel is shipped from the factory, the voltage of the reference voltage terminal Vref can be adjusted to ensure that the number of pulses at the second output terminal Vout2 is the sane for each display panel under normal output of the first voltage terminal V1.

In some embodiments, as shown in FIGS. 3 and 4 the multiple stages of voltage output terminals can include n stages of voltage output terminals, where a voltage at an $m^{th}$ stage of the voltage output terminal is less than a voltage at an $(m+1)^{th}$ stage of the voltage output terminal. For example, the voltage at the second stage of the voltage output terminal N2 is less than the voltage at the third stage of the voltage output terminal N3. An $m^{th}$ stage of the first output terminal is arranged in correspondence with the n stage of the voltage output terminal. For example, the third stage of the first output terminal Vout3 is arranged in correspondence with the third stage of the voltage output terminal N3. In some embodiments, as shown in FIG. 4, the first output terminal can output the shift signal at intervals in the order the number of stages increases.

Figure 5:
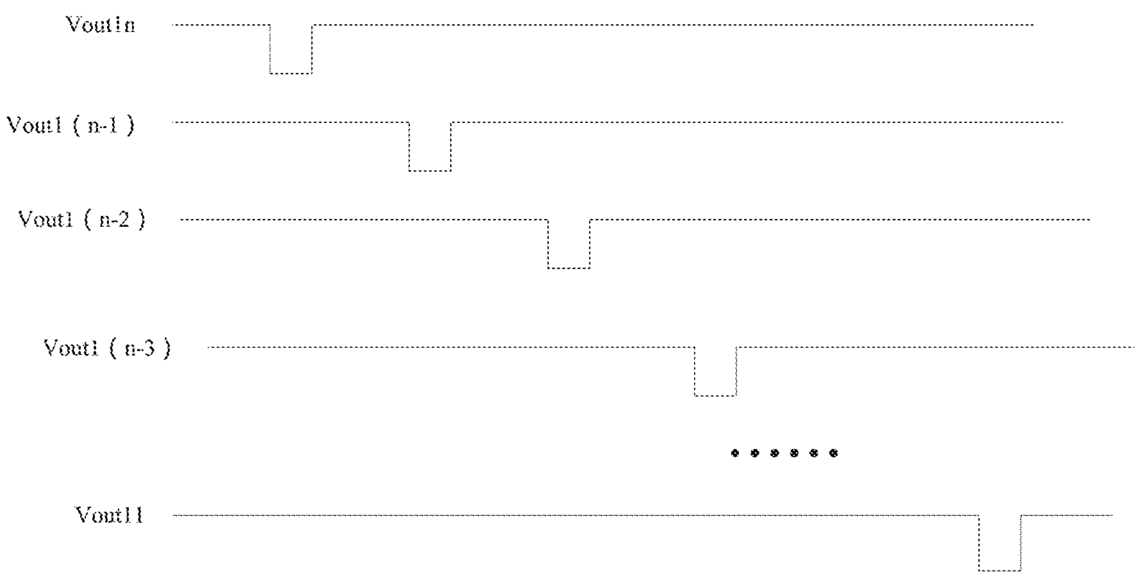
FIG. 5 shows another timing diagram of multiple first output terminals in FIG. 3.
Figure 6:
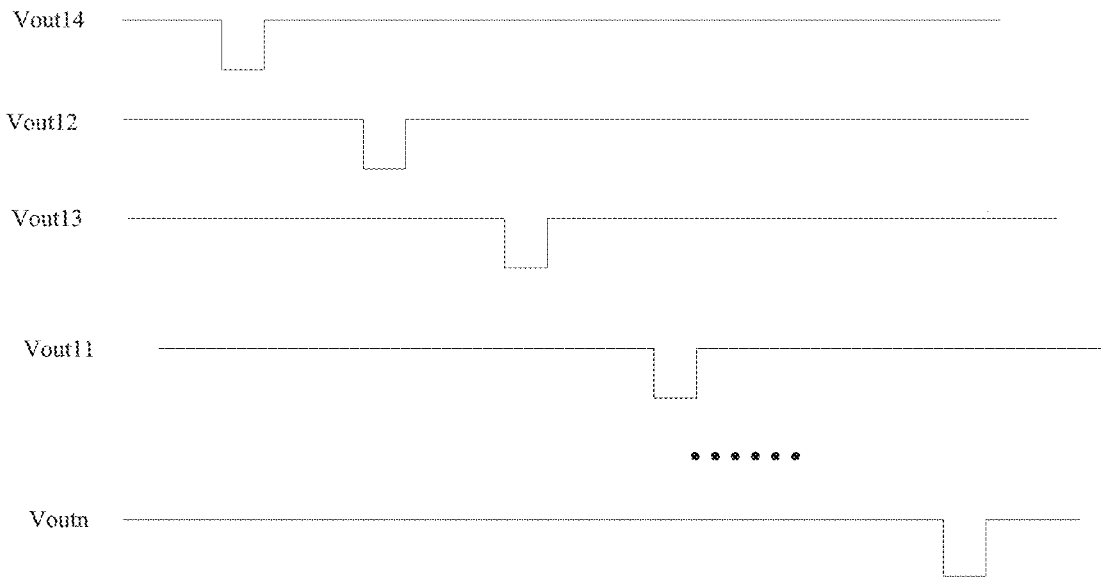
FIG. 6 shows another timing diagram of multiple first output terminals in FIG. 3.

It should be understood that in some embodiments, the multiple stages of first output terminals can also have other timing forms. For example, as shown in FIG. 5, there is another timing diagram for multiple first output terminals in FIG. 3, in which the multiple stages of first output terminals can also output the shift signal at intervals in the order the number of stages decreases. For another example, as shown in FIG. 6, it is another timing diagram for multiple first output terminals in FIG. 3, in which the multiple stages of first output terminals can also output the shift signal at intervals in any order. As long as the gate driving circuit outputs only one shift signal at each first output terminal within a driving cycle, the display panel can determine whether the first power supply terminal is normal by measuring the number of pulse signals at the second output terminal as mentioned above.

As shown in FIG. 3, both the first transistor and the second transistor can be P-type transistors. It should be understood that in some embodiments, the first transistor can be an N-type transistor, and the second transistor can also be the N-type transistor. In addition, the first transistor and the second transistor can also be switch units of other structures. As shown in FIG. 3, in some embodiments, the voltage divider circuit 81 can include n resistors R1, R2, R3, R4, . . . , Rn, and the multiple resistors connected in series between the first voltage terminal V1 and the reference voltage terminal Vref. The voltage output terminals N1, N2, N3, . . . , Nn of the voltage divider circuit 81 can be connected between adjacent resistors. In addition, as shown in FIG. 3, one voltage output terminal of the voltage divider circuit 81 can also be connected to the reference voltage terminal Vref One resistor can be connected between adjacent two stages of voltage output terminals, and resistance values of multiple resistors can be the same. The multiple resistors can be designed to be of one hundred ohms or more by adjusting a line width and a line length, thereby making the resistance values and resistance values of normal wiring large different from each other, so as to avoid the significant impact of the normal wiring on the voltage divider characteristic of the voltage divider circuit.

From the above analysis, it can be obtained that when the second output terminal Vout2 has x pulses:

VNx−VDD≤Vth<VNx+1−VDD, where VNx is a voltage at an $X^{th}$ stage of the voltage output terminal Nx, VNx+1 is a voltage at an $(X+1)^{th}$ stage of the voltage output terminal Nx+1, and VDD is the voltage at the first power supply terminal VDD, VNx−VDD≤Vth<VNx+1−VDD can be written as:

$$VDD+Vth=[VNx+VNx+1-VNx)/2]\pm(VNx+1-VNx)/2;$$

The control accuracy of the detection circuit can be defined as (VNx+1−VNx)/2.

Because the voltage output terminal Nx has a voltage of (Vref−V1)/(Rtotal)*Rxtotal+V1, where Vref is the voltage at the reference voltage terminal, V1 is the voltage at the first voltage terminal, Rtotal=R1+R2+ . . . +Rn, and Rxtotal=R1+R2+ . . . +Rx, the control accuracy of the detection circuit is (Vref−V1)/2n. Thai is, the accuracy of the detection circuit can be controlled by controlling the number of resistors.

Figure 7:
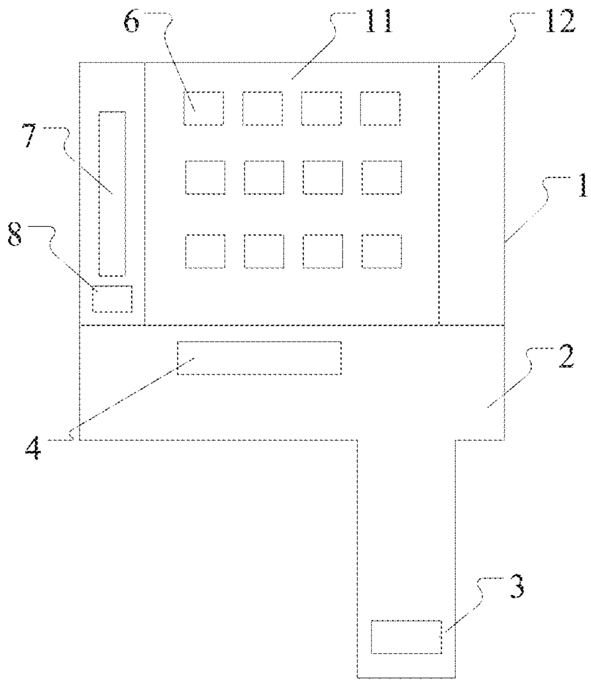
FIG. 7 is a schematic structural diagram of a display panel according to embodiments of the present disclosure.

In some embodiments, as shown in FIG. 7, a schematic structural diagram of a display panel according to embodiments of the present disclosure is provided. The display panel can further include a display screen 1, which can include multiple light-emitting units. The first voltage terminal V1 can be located on the display screen and connected to the cathode of the light-emitting unit. The display panel can detect the voltage of the cathode of the light-emitting unit on the display screen through the above detection circuit. In some embodiments, the first voltage terminal V1 can be located at any position on the display screen. For example, the first voltage terminal V1 can be located at a centroid of the display screen, or for example, the first voltage terminal can be located at an edge of the display screen. In some embodiments, as shown in FIG. 7, the display panel can further include a flexible circuit board 2 and a power management chip 3. The flexible circuit board 2 can be connected to the display screen 1 by binding a PIN corner, and connected to the power management chip 3 through a connector. The power management chip 3 can provide power to the first voltage terminal V1 located on the display screen through the connector, the flexible circuit board 02, the binding PIN corner, and other connector components.

In some embodiments, as shown in FIG. 7, the display screen 1 can include a display area 11 and a non-display area 12. The display screen can further include multiple pixel driving circuits 6 located in the display area. The gate driving circuit 7 mentioned above can be integrated into the non-display area 12 of the display screen. The gate driving circuit 7 can be configured to provide a gate driving signal to the pixel driving circuit 6. For example, a structure of the pixel driving circuit 6 can be shown in FIG. 2, and the gate driving signal provided by the gate driving circuit 7 can include one or more of signals at the gate driving signal terminal, the reset signal terminal, and the enable signal terminal. In some embodiments, one driving cycle of the gate driving circuit 7 can refer to one frame driving cycle of the display panel. Therefore, the display panel can also determine whether the gate driving circuit in the display screen 1 is outputting a shift signal normally through the number of high-level pulses at the second output terminal Vout2 in one driving cycle of the gate driving circuit. In some embodiments, as shown in FIG. 7, the detection circuit 8 can also be integrated into the non-display area 12 of the display screen.

Figure 8:
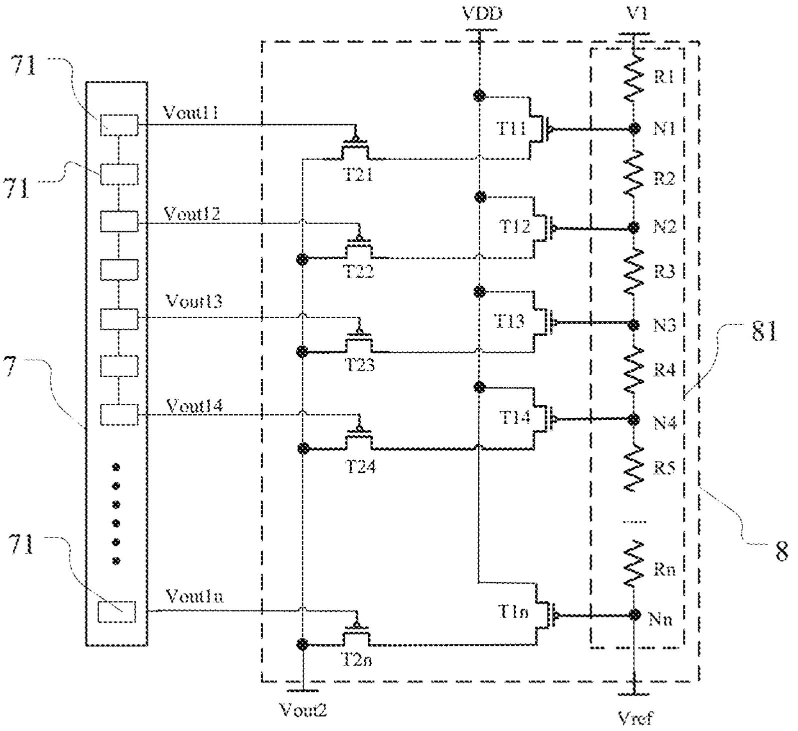
FIG. 8 is a schematic structural diagram of another display panel according to embodiments of the present disclosure.

As shown in FIG. 8, a schematic structural diagram of another display panel according to embodiments of the present disclosure is provided. The gate driving circuit 7 can include multiple cascaded shift register units 71, and the multiple cascaded shift register units 71 can sequentially output shift signals in the order their number of stages increases. For example, in FIG. 8, the shift register units 71 sequentially output shift signals from top to bottom. In some embodiments, at least some of the output terminals of the shift register units 71 can be used to form the first output terminals. In some embodiments, as shown in FIG. 8, one shift register unit can be provided between adjacent two stages of first output terminals at intervals. That is, the first stage of the first output terminal can be connected to the first stage of the shift register unit, and the second stage of the first output terminal can be connected to the third stage of the shift register unit. It should be understood that in some other embodiments, other number of shift register units can be provided between adjacent two stages of first output terminals at intervals, or the shift register unit can be not provided between adjacent two stages of first output terminals at intervals. By adjusting the number of shift register units between adjacent two stages of first output terminals at intervals, a spacing between adjacent two pulse signals at the second output terminal can be adjusted. In some embodiments, the number of shift register units that are provided between different adjacent two stages of first output terminals at intervals can be the same or different.

Figure 9:
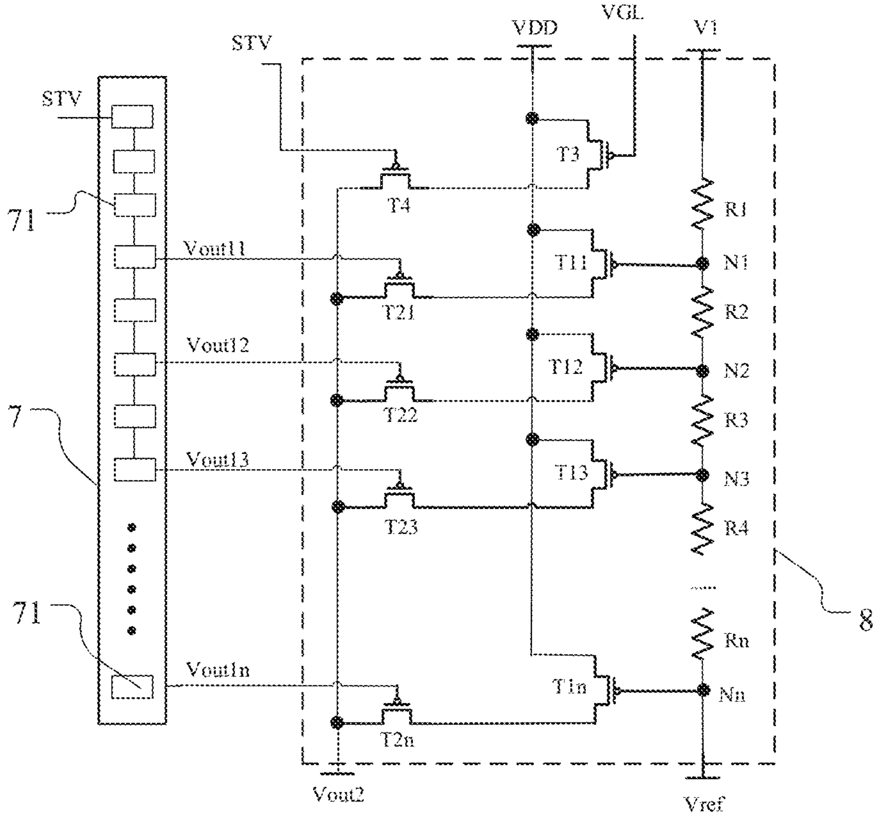
FIG. 9 is a schematic structural diagram of another display panel according to embodiments of the present disclosure.
Figure 10:
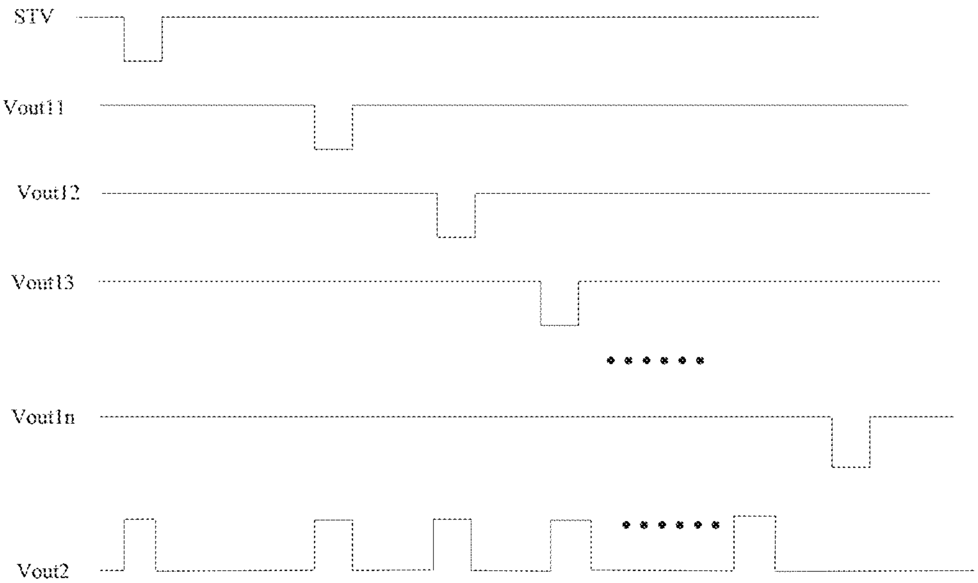
FIG. 10 is a timing diagram of each node in FIG. 9.

In some embodiments, as shown in FIG. 9, a schematic structural diagram of another display panel according to embodiments of the present disclosure is provided. As shown in FIGS. 7 and 9, the display panel can further include a driving chip 4, which can be connected to the first power supply terminal VDD, as well as a second voltage terminal VGL and a starting signal terminal STV The driving chip 4 can be used to provide corresponding signals to the first power supply terminal VDD, the second voltage terminal VGL, and the starting signal terminal STV, respectively. In some embodiments, the first power supply terminal VDD can provide high-level voltage to the gate driving circuit mentioned above, the second voltage terminal VOL can provide low-level voltage to the gate driving circuit. In one frame driving cycle, the starting signal terminal STV can provide a starting signal to an input signal terminal of the first stage of the shift register unit in the gate driving circuit mentioned above. The gate driving circuit is capable of responding to an effective level signal of the starting signal terminal STV and starting to output the shift signal to the first output terminal. The effective level signal of the starting signal terminal STV can be earlier in timing than all shift signals. The detection circuit 8 can further include a third transistor T3 and a fourth transistor T4. A gate of the third transistor T3 is connected to the second power supply terminal VGL, and a first electrode of the third transistor T3 is connected to the first power supply terminal VDD. Agate of the fourth transistor T4 is connected to the starting signal terminal STV, a first electrode of the fourth transistor T4 is connected to a second electrode of the third transistor T3, and a second electrode of the fourth transistor T4 is connected to the second output terminal Vout2. In some embodiments, the multiple stages of shift register units output sequentially shift signals in the order their number of stages increases, and the multiple stages of first output terminals output shift signals in the order their number of stages increases. An output terminal of an $(M+(X-1)N)^{th}$ stage of the shift register unit is used to form an $X^{th}$ stage of the first output terminal, where M represents the number of a stage of the shift register unit among the cascaded shift register units, which is used as the first stage of the first output terminal, N represents difference between the number of stages of shift register units used as adjacent two stages of first output terminals, M, N, and X are positive integers greater than or equal to 1, and M is not equal to N. For example, as shown in FIG. 9, M equals 4 and N equals 2. As shown in FIG. 10, a timing diagram of each node in FIG. 9 is provided, in which, STV is the timing of the starting signal terminal STV, Vout11 is the timing of the first output terminal Vout11 in FIG. 9, Vout12 is the timing of the first output terminal Vout12 in FIG. 9, Vout13 is the timing of the first output terminal Vout13 in FIG. 9, Vout1*n* is the timing of the first output terminal Vout1*n* in FIG. 9, and Vout2 is the timing of the second output terminal in FIG. 9. As shown in FIG. 10, when the driving chip operates normally, that is, the first power supply terminal VDD outputs a high-level voltage, the second voltage terminal VGL outputs a low-level voltage, and the starting signal terminal STV inputs a starting signal to the gate driving circuit, the second output terminal Vout2 can output a high-level pulse signal, and because M is greater than N, a distance between the first pulse signal and the second pulse signal in the second output terminal Vout2 is greater than a distance between other adjacent pulse signals. As a result, it can be determined whether the display panel has output the pulse signal corresponding to the starting signal terminal based on a form of the pulse signal output by the second output terminal Vout2. When the display panel outputs the pulse signal corresponding to the starting signal terminal, it can be considered that the driving chip operates normally.

As shown in FIG. 9, both the third transistor and the fourth transistor can be P-type transistors. It should be understood that in some other embodiments, the third transistor can be an N-type transistor, and the fourth transistor can also be the N-type transistor. In some embodiments, the gate of the third transistor can be connected to VDD of the first unit, and the first electrode of the third transistor can be connected to the second power supply terminal VGL In some embodiments, the third transistor and the fourth transistor can also be switch units of other structures.

Figure 11:
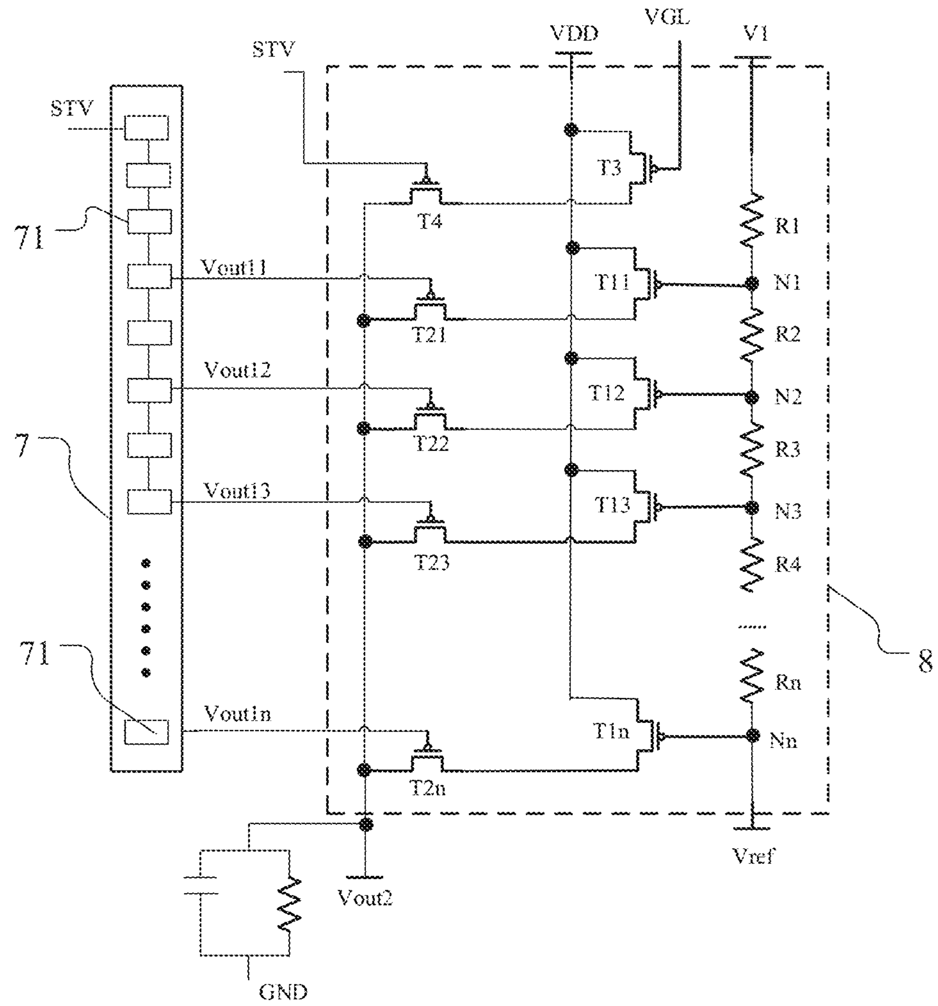
FIG. 11 is a schematic structural diagram of another display panel according to embodiments of the present disclosure.

As shown in FIG. 11, a schematic structural diagram of another display panel according to embodiments of the present disclosure is provided. The detection circuit can further include an RC filtering circuit, which can include a resistor R and a capacitor C. The resistor R and the capacitor C can be connected in parallel between the second output terminal Vout2 and a grounding terminal GND The RC filtering circuit can filter a waveform at the second output terminal, to achieve a smooth waveform output from the second output terminal.

Figure 12:
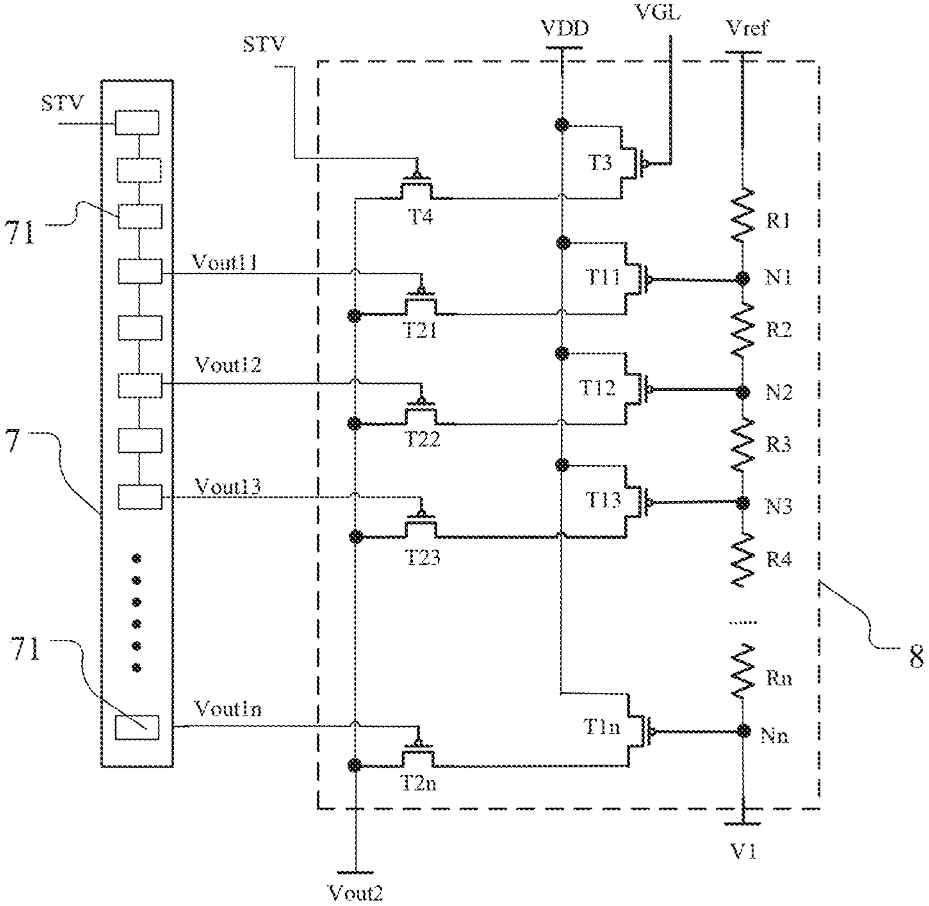
FIG. 12 is a schematic structural diagram of another display panel according to embodiments of the present disclosure.

As shown in FIG. 3, the power management circuit 3 can also be used to provide a high-level signal to the pixel driving circuit. The power management circuit 3 can provide the high-level signal to the first power signal terminal VDD in FIG. 2. As shown in FIG. 12, a schematic structural diagram of another display panel according to embodiments of the present disclosure is provided. The first voltage terminal V1 can be located on the display screen, and the first voltage terminal V1 can be connected to the first electrode of the driving transistor T3 as shown in FIG. 2. In some embodiments, the voltage of the reference voltage terminal Vref can be less than the voltage of the first voltage terminal V1. In some embodiments, the display panel can also determine whether the voltage of the first voltage terminal V1 is normal based on the number of pulse signals output by the second output terminal Vout2.

In some embodiments, the display panel can be provided with two detection circuits 8 as shown in FIG. 3, which can be used to detect a cathode voltage of the light-emitting unit and a high-level voltage in the pixel driving circuit, respectively.

Embodiments of the present disclosure also provide a method for detecting a display panel, which is used to detect the display panel mentioned above. The method can include following steps.

The number of pulse signals output by the second output terminal in a frame driving cycle is obtained.

Whether the gate driving circuit and the voltage of the first voltage terminal in the display panel are normal is determined based on the number of pulse signals output by the second output terminal in the frame driving cycle.

When the number of pulse output by the second output terminal in the frame driving cycle is equal to a preset value, the gate driving circuit and the voltage of the first voltage terminal are normal.

When the number of pulse output by the second output terminal in the frame driving cycle is not equal to a preset value, the gate driving circuit or the voltage of the first voltage terminal is abnormal.

The method for detecting the display panel has been described in detail in above embodiments, and will not be repeated herein.

The current passing through the first voltage terminal of the display panel varies at different brightness levels, resulting in different voltage drops in the wiring used to transmit power signals to the first voltage terminal, which leads to fluctuations in the voltage of the first voltage terminal at different brightness levels, and thus abnormal brightness or even color deviation of the display panel will be caused.

Embodiments of the present disclosure also provide a method for compensating a display panel, which is used to compensate the display panel mentioned above. The method can include following steps.

The number of pulse signals output by the second output terminal in a frame driving cycle is obtained.

The voltage of the first voltage terminal is compensated based on the number of pulse signals output by the second output terminal in the frame driving cycle.

According to the above content, when there are many resistors in the voltage divider circuit, the voltage of the first voltage terminal can be limited to a small range through the number of pulse signals at the second output terminal. Thus, the voltage value of the first voltage terminal can be approximately obtained, and the display panel can compensate for the first voltage terminal in the display screen through the voltage value of the first voltage terminal.

Figure 13:
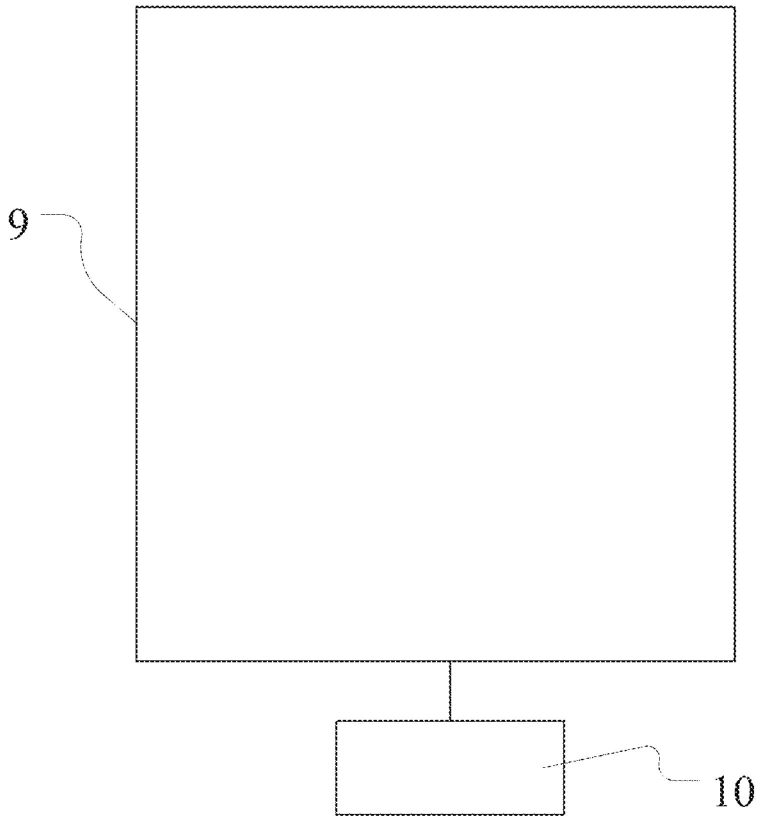
FIG. 13 is a schematic structural diagram of a display device according to embodiments of the present disclosure.

Embodiments of the present disclosure also provide a display device, as shown in FIG. 13, a schematic structural diagram of a display device according to embodiments of the present disclosure is provided. The display device can include a display panel 9 and a processor 10, and the processor 10 can be connected to the second output terminal of the display panel 9, for recording the number of pulse signals output by the second output terminal in a frame driving cycle. Thus, the display device can determine whether the first voltage terminal in the display panel is at a normal voltage value based on the number of pulses obtained by the processor 10.

It should be understood that the general description above and the detailed description in the following text are only illustrative and explanatory, and do not limit this disclosure.

After considering the specification and practices of the invention disclosed herein, those skilled in the art will easily come up with other implementation solutions of the present invention. The present disclosure aims to cover any variations, uses, or adaptive changes of the present invention, which follow the general principles of the present invention and include common knowledge or commonly used technical means in the art that are not disclosed in the present disclosure. The specification and embodiments are only considered exemplary, and the true scope and spirit of the present invention are defined by appended claims.

It should be understood that the present disclosure is not limited to the precise structure described above and shown in the drawings, and various modifications and changes can be made without departing from its scope. The scope of the present disclosure is limited only by the appended claims.

What is claimed is:

1. A display panel, comprising:

a first voltage terminal;

a gate driving circuit, wherein the gate driving circuit comprises multiple stages of first output terminals, and the multiple stages of first output terminals sequentially output shift signals at intervals; and a detection circuit, comprising:

a voltage divider circuit connected between the first voltage terminal and a reference voltage terminal, wherein the voltage divider circuit comprises multiple stages of voltage output terminals, and the voltage output terminals are arranged in one-by-one correspondence with the first output terminals;

multiple first switching units arranged in one-by-one correspondence with the multiple stages of voltage output terminals, wherein control terminals of the first switching units are connected to the voltage output terminals corresponding thereto, and first terminals of the first switching units are connected to a first power supply terminal; and multiple second switching units arranged in one-by-one correspondence with the multiple first switching units, wherein control terminals of the second switching units are connected to the first output terminals corresponding thereto, first terminals of the second switching units are connected to second terminals of the first switching units corresponding thereto, and second terminals of the second switching units are connected to a second output terminal.

2. The display panel according to claim 1, further comprising:

a driving chip connected to the first power supply terminal, a second voltage terminal and a starting signal terminal, wherein the driving chip is configured to provide signals to the first power supply terminal, the second voltage terminal, and the starting signal terminal, respectively, and the gate driving circuit is connected to the starting signal terminal, and wherein in a frame driving cycle, the gate driving circuit is configured to respond to an effective level signal at the starting signal terminal and start outputting the shift signals to the first output terminals, and the effective level signal at the starting signal terminal is earlier in timing than all shift signals;

a third switching unit, wherein a control terminal of the third switching unit is connected to a second power supply terminal, and a first terminal of the third switching unit is connected to the first power supply terminal; and a fourth switching unit, wherein a control terminal of the fourth switching unit is connected to the starting signal terminal, a first terminal of the fourth switching unit is connected to a second terminal of the third switching unit, and a second terminal of the fourth switching unit is connected to the second output terminal.

3. The display panel according to claim 2, wherein the third switching unit comprises:

a third transistor, wherein a gate of the third transistor is connected to the second power supply terminal, and a first electrode of the third transistor is connected to the first power supply terminal; and the fourth switching unit comprises:

a fourth transistor, wherein a gate of the fourth transistor is connected to the starting signal terminal, a first electrode of the fourth transistor is connected to a second electrode of the third transistor, and a second electrode of the fourth transistor is connected to the second output terminal.

4. The display panel according to claim 1, wherein the voltage divider circuit comprises:

multiple resistors connected in series between the first voltage terminal and the reference voltage terminal, wherein the voltage output terminals of the voltage divider circuit are connected between adjacent resistors.

5. The display panel according to claim 4, wherein one of the multiple resistors is connected between adjacent two stages of voltage output terminals, and resistance values of the multiple resistors are the same.

6. The display panel according to claim 1, wherein the first switching unit comprises:

a first transistor, wherein a gate of the first transistor is connected to a voltage output terminal corresponding thereto, and a first electrode of the first transistor is connected to the first power supply terminal; and the second switching unit comprises:

a second transistor, wherein a gate of the second transistor is connected to a first output terminal corresponding thereto, a first electrode of the second transistor is connected to a second electrode of the first transistor corresponding thereto, and a second electrode of the second transistor is connected to the second output terminal.

7. The display panel according to claim 6, wherein the first transistor is an N-type transistor or P-type transistor, and the second transistor is an N-type transistor or P-type transistor.

8. The display panel according to claim 1, further comprising:

a display screen comprising multiple light-emitting units, wherein the first voltage terminal is located on the display screen, and is connected to cathodes of the light-emitting units.

9. The display panel according to claim 8, wherein the display screen comprises a non-display area, and the detection circuit is integrated into the non-display area of the display screen.

10. The display panel according to claim 1, further comprising:

a display screen comprising multiple pixel driving circuits, wherein each of the multiple pixel driving circuits comprises a driving transistor, the first voltage terminal is located on the display screen, and wherein a first electrode of the driving transistor is connected to the first voltage terminal, and the driving transistor is configured to output a driving current at a second electrode based on a gate voltage of the driving transistor.

11. The display panel according to claim 1, further comprising multiple pixel driving circuits, wherein the gate driving circuits are configured to provide gate driving signals to the pixel driving circuits.

12. The display panel according to claim 11, wherein the multiple stages of voltage output terminals comprise n stages of power output terminals, and wherein a voltage of an $m^{th}$ stage of the voltage output terminal is less than a voltage of an $(m+1)^{th}$ stage of the voltage output terminal; and wherein an $m^{th}$ stage of the first output terminal is arranged in correspondence with the $m^{th}$ stage of the voltage output terminal, and wherein the first output terminals sequentially output the shift signals at intervals in the order a number of the stage of the first output terminal increases, or the first output terminals sequentially output the shift signals at intervals in the order the number of the stage of the first output terminal decreases.

13. The display panel according to claim 12, wherein the gate driving circuit comprises multiple cascaded shift register units, and output terminals of at least some of the shift register units are configured to form the first output terminals.

14. The display panel according to claim 13, wherein multiple stages of the shift register units sequentially output the shift signals in the order a number of the stage of the shift register unit increases, and the multiple stages of first output terminals sequentially output the shift signals in the order the number of the stage of the first output terminal increases; and wherein an output terminal of an $(M+(X-1)N)^{th}$ stage of the shift register unit is configured to form an $X^{th}$ stage of the first output terminal, where M, N, and X are positive integers greater than or equal to 1, and N is not equal to M.

15. The display panel according to claim 1, wherein the detection circuit further comprises:

an RC filtering circuit connected to the second output terminal.

16. A method for detecting a display panel, configured to detect the display panel according to claim 1, comprising:

obtaining a number of pulse signals output by the second output terminal in a frame driving cycle;

determining whether the gate driving circuit and a voltage of the first voltage terminal in the display panel are normal based on the number of the pulse signals output by the second output terminal in the frame driving cycle; and determining that the gate driving circuit and the voltage of the first voltage terminal are normal in response to the number of the pulse signals output by the second output terminal in the frame driving cycle being equal to a preset value, and determining that the voltage of the first voltage terminal or the gate driving circuit is abnormal in response to the number of the pulse signals output by the second output terminal in the frame driving cycle being not equal to the preset value.

17. A method for compensating a display panel, configured to compensate the display panel according to claim 1, comprising:

obtaining a number of pulse signals output by the second output terminal in a frame driving cycle; and compensating a voltage of the first voltage terminal based on the number of the pulse signals output by the second output terminal in the frame driving cycle.

18. A display device, comprising:

the display panel according to claim 1; and a processor connected to the second output terminal of the display panel, and configured to record a number of pulse signals output by the second output terminal during a frame drive cycle.

* * * * *